US009878932B2

(12) United States Patent
Demott et al.

(10) Patent No.: US 9,878,932 B2
(45) Date of Patent: Jan. 30, 2018

(54) SUBMERGED COMBUSTION MELTERS AND METHODS

(71) Applicant: KNAUF INSULATION, Vise (BE)

(72) Inventors: Jerry Demott, Mont-Saint-Guibert (BE); Bostjan Marolt, Mont-Saint-Guibert (BE); Randy Etzkorn, Mont-Saint-Guibert (BE); David Ducarme, Mont-Saint-Guibert (BE)

( * ) Notice: Subject to any disclaimer, the term of this patent is extended or adjusted under 35 U.S.C. 154(b) by 0 days.

(21) Appl. No.: 14/908,360

(22) PCT Filed: Jul. 30, 2014

(86) PCT No.: PCT/EP2014/066443
§ 371 (c)(1),
(2) Date: Jan. 28, 2016

(87) PCT Pub. No.: WO2015/014920
PCT Pub. Date: Feb. 5, 2015

(65) Prior Publication Data
US 2016/0159675 A1    Jun. 9, 2016

(30) Foreign Application Priority Data

Jul. 31, 2013   (GB) .................................. 1313654.4

(51) Int. Cl.
*C03B 5/183* (2006.01)
*C03B 37/01* (2006.01)
(Continued)

(52) U.S. Cl.
CPC ............ *C03B 5/183* (2013.01); *C03B 5/2356* (2013.01); *C03B 37/01* (2013.01); *F23C 3/004* (2013.01);
(Continued)

(58) Field of Classification Search
CPC ....... C03B 5/183; C03B 5/193; C03B 5/2356; C03B 5/12
See application file for complete search history.

(56) References Cited

U.S. PATENT DOCUMENTS 3,248,205 A    4/1966 Dolf et al.
3,260,587 A    7/1966 Dolf et al.
(Continued)

FOREIGN PATENT DOCUMENTS

DE           10029983 A1    1/2002
EP              086858 A1    8/1983
(Continued)

OTHER PUBLICATIONS

"Energy-efficient glass melting—The next generation melter—Final Report" (82 pages), David Rue, US Gas Technology Institute Project 20621, pp. 26-30, Figures 23-41 and pp. 1-73, Figures 23, 25, 61, 68, and 70—Mar. 1, 2008.

(Continued)

*Primary Examiner* — Jason L Lazorcik
(74) *Attorney, Agent, or Firm* — Knauf Insulation, Inc.; James K. Blodgett

(57) ABSTRACT

A submerged combustion melter 10 is arranged with a vertical melting chamber 11, which may be cylindrical, and at least five submerged combustion burners 21-26 in the bottom base 13, the burners so spaced apart from each other and from the walls and angled from the vertical that in use a toroidal flow pattern can be achieved, providing intensive mixing. The claims also pertain to a method of melting a vitrifiable material from solid batch by submerged combustion melting.

13 Claims, 2 Drawing Sheets

(51) Int. Cl.
*C03B 5/235* (2006.01)
*F23C 3/00* (2006.01)
*F23D 14/20* (2006.01)
*C03B 5/12* (2006.01)
*C03B 5/44* (2006.01)

(52) U.S. Cl.
CPC ............... *F23D 14/20* (2013.01); *C03B 5/12* (2013.01); *C03B 5/44* (2013.01); *C03B 2211/22* (2013.01); *C03B 2211/70* (2013.01)

(56) References Cited

U.S. PATENT DOCUMENTS

| | | | |
|---|---|---|---|
| 3,592,151 A * | 7/1971 | Webber | C03B 3/00 110/228 |
| 4,622,007 A | 11/1986 | Gitman | |
| 5,062,789 A | 11/1991 | Gitman | |
| 5,728,190 A * | 3/1998 | Pieper | C03B 3/00 588/252 |
| 6,109,062 A | 8/2000 | Richards | |
| 6,460,376 B1 | 10/2002 | Jeanvoine et al. | |
| 2002/0162358 A1 | 11/2002 | Jeanvoine et al. | |
| 2005/0039491 A1 | 2/2005 | Maugendre et al. | |
| 2005/0236747 A1 | 10/2005 | Rue et al. | |
| 2006/0000239 A1 | 1/2006 | Jeanvoine et al. | |
| 2006/0105899 A1 | 5/2006 | Jacques et al. | |
| 2008/0145804 A1 * | 6/2008 | Palmieri | C03B 5/2356 431/8 |
| 2008/0184919 A1 | 8/2008 | D'Agostini et al. | |
| 2008/0256981 A1 * | 10/2008 | Jacques | C03B 3/02 65/19 |
| 2008/0276652 A1 | 11/2008 | Bauer et al. | |
| 2009/0176639 A1 | 7/2009 | Jacques et al. | |
| 2011/0236846 A1 * | 9/2011 | Rue | F27B 3/205 432/195 |
| 2011/0308280 A1 | 12/2011 | Huber | |
| 2012/0077135 A1 | 3/2012 | Charbonneau | |
| 2013/0086944 A1 | 4/2013 | Shock et al. | |
| 2013/0086949 A1 | 4/2013 | Charbonneau | |
| 2013/0086950 A1 * | 4/2013 | Huber | C03B 5/167 65/134.5 |
| 2013/0086951 A1 | 4/2013 | Charbonneau et al. | |
| 2013/0086952 A1 * | 4/2013 | Charbonneau | C03B 37/06 65/377 |
| 2013/0260980 A1 | 10/2013 | Touslee et al. | |
| 2013/0283861 A1 | 10/2013 | Mobley et al. | |
| 2013/0327092 A1 * | 12/2013 | Charbonneau | C03B 5/04 65/29.21 |
| 2014/0007622 A1 | 1/2014 | Shock et al. | |
| 2014/0007623 A1 | 1/2014 | Charbonneau et al. | |
| 2014/0090423 A1 | 4/2014 | Charbonneau et al. | |
| 2014/0144185 A1 * | 5/2014 | Shock | C03B 5/20 65/134.9 |
| 2015/0274578 A1 | 10/2015 | Solvang et al. | |
| 2015/0291465 A1 | 10/2015 | Cowles et al. | |
| 2016/0075586 A1 * | 3/2016 | Charbonneau | C03B 5/1672 431/10 |
| 2016/0083279 A1 * | 3/2016 | Cai | C03B 5/1672 432/13 |
| 2016/0145135 A1 * | 5/2016 | Baker | C03B 5/193 65/134.5 |
| 2016/0159675 A1 * | 6/2016 | Demott | C03B 5/183 65/540 |
| 2016/0168001 A1 * | 6/2016 | Demott | C03B 5/12 65/482 |
| 2016/0185642 A1 * | 6/2016 | Demott | C03B 5/183 65/134.5 |
| 2016/0207814 A1 * | 7/2016 | Demott | C03B 5/005 |

FOREIGN PATENT DOCUMENTS

| | | |
|---|---|---|
| EP | 2578548 A2 | 4/2013 |
| FR | 2837916 A1 | 10/2003 |
| JP | 2012096942 A | 5/2012 |
| WO | 8707591 A1 | 12/1987 |
| WO | 2014057130 A1 | 4/2014 |

OTHER PUBLICATIONS

"Submerged Combustion Melting of Glass" (14 pages, pp. 262-274), David Rue and John T. Brown, International Journal of Applied Glass Science, vol. 2, No. 4, pp. 270-271, Figure 2—Nov. 9, 2011.

"Submerged Combustion Melter" (9 pages), David Rue, Walter Kunc, and Victor A. Nosovitsky, Institute of Gas Technology (Chicago, IL), Vladimir M. Olabin and Alexander B. Maximuk (Gas Institute, Naval Academy of Sciences (Kiev, Ukraine), American Research Conference, Chicago, IL, Sep. 21-22, 1997.

"Energy-efficient glass melting—The next generation melter" (24 pages), David Rue, Gas Technology Institute, DOE Industrial Technology Program, 2005 Project-Industry Review, Sep. 15, 2005.

* cited by examiner

SUBMERGED COMBUSTION MELTERS AND METHODS

CROSS-REFERENCE TO RELATED APPLICATIONS

This application is a U.S. national counterpart application under 35 U.S.C. § 371 of International Application Serial No. PCT/EP2014/066443, filed Jul. 30, 2014, which claims priority to GB Application Serial No. 1313654.4, filed Jul. 31, 2013, the entire disclosures of which are expressly incorporated by reference herein.

TECHNICAL FIELD

The present invention relates to submerged combustion melters, notably for melting vitreous or vitrifiable material, and to processes using a submerged combustion melter.

BACKGROUND

Vitreous materials are generally manufactured from a mixture of raw materials, for example silicates, basalt, limestone, soda ash and other minor constituents which are introduced into a melter and melted into a viscous liquid state at temperatures in the order of 1250 to 1500° C.; the melt is then supplied to a forming process. Depending on the intended use of the melt, for example for manufacture of flat glass, hollow glass, continuous fibers for reinforcement purposes or fibers for insulation purposes, an appropriate further melt refining step may be required upstream of the forming process. The chemical composition of the melt and its physical properties are selected as a function of the intended use and the forming process.

Conventional glass melters comprise an energy supply from above a glass melt surface, for instance from burners generating a flame in a space between the glass melt surface and a crown of the melter, whereby heat is transferred to the glass melt by the flame itself and by radiation from the crown material. Raw batch material to be melted is loaded at the top of the glass melt in the melter and heat is transferred from the melt to the batch material which is incorporated into the melt.

In some glass melters, energy is supplied by electrically heated electrodes arranged below the surface of the melt; such electrodes may provide the only heat source or be used in combination with burners.

A further type of glass melter has one or more burner nozzles arranged below the surface of the melt such that the burner flame and combustion products pass through the melt. This arrangement is referred to as submerged combustion.

Glass melters used to manufacture stone wool insulation have traditionally been cupola furnaces.

SUMMARY

According to one of its aspects, the present invention provides a submerged combustion melter as defined in claim 1. Other independent claims define other aspects of the invention. Dependent claims define preferred and/or alternative embodiments.

DETAILED DESCRIPTION

Figure 1:
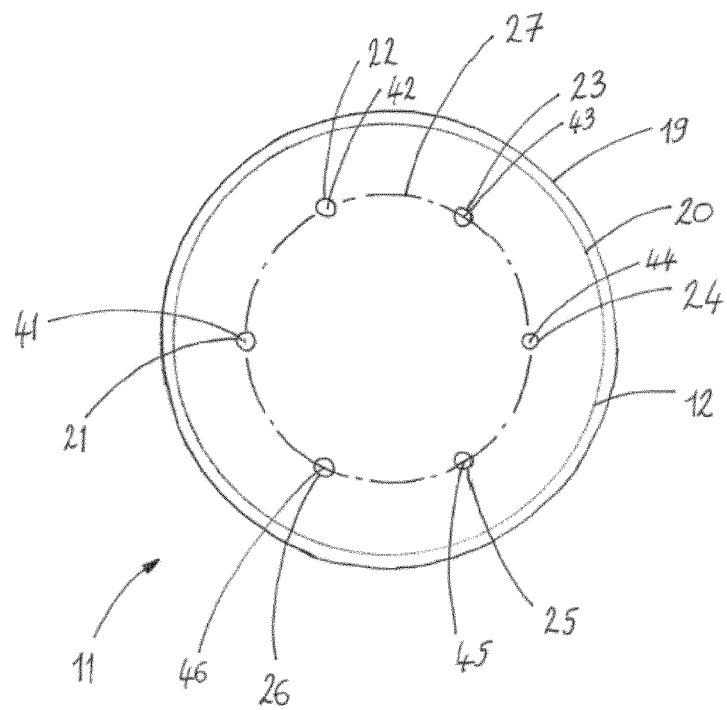
FIG. 1 shows a horizontal cross-sectional plan view of a melter.

One or more aspects described in the following patent applications, which also relate to submerged combustion melting and/or melters, may be used in respect of the inventions of the present patent application and each of the following patent applications is hereby incorporated by reference:

| Application | Name of applicant | Priority claimed | Our ref |
|---|---|---|---|
| International PCT patent application PCT/EP2014/ 066440 filed on 30 Jul. 2014 | Knauf Insulation | GB 1313653.6 | P0524/PCT KMRecup |
| International PCT patent application PCT/EP2014/ 066441 filed on 30 Jul. 2014 | Knauf Insulation | GB 1313656.9 | P0554/PCT KMScrap |
| International PCT patent application PCT/EP2014/ 066442 filed on 30 Jul. 2014 | Knauf Insulation | GB 1313652.8 | P0523/PCT KMburn |
| International PCT patent application PCT/EP2014/ 066444 filed on 30 Jul. 2014 | Knauf Insulation | GB 1313651.0 | P0522/PCT KMMod |

As used herein the term "vertical central melting chamber axis" means the vertical or substantially vertical symmetry axis of the melting chamber. The melting chamber may have a circular horizontal cross section; it may be cylindrical. Alternatively, the melting chamber may have a polygonal horizontal cross section, notably in the form of a regular polygon; the polygon may have six, seven, eight, nine, ten or more sides. Each of these shapes has a defined central symmetry axis. The horizontal cross section of the melting chamber may be elliptical or oval; in this and in similar cases the vertical central melting chamber axis is the axis passing through the center of a circle in which the relevant horizontal cross sectional shape is inscribed.

The nozzle outlets of the submerged combustion burners may be arranged at the same vertical height within the melting chamber i.e. in the same horizontal plane. Alternatively, they may be arranged at different vertical heights. The burner positioning plane thus is defined as being arranged at a "weighted average distance with respect to each of the nozzle outlets". That means that the average distance is weighted over the number of burners.

The term "weighted burner axis-periphery distance in the melter" should be understood to mean the weighted distance between the central burner axis as defined and the inner periphery of the melting chamber. In cases where the burner axis and the peripheral wall(s) of the melting chamber are parallel, this is simply the distance between the burner axis and the peripheral wall. In other cases, the "weighted burner axis-periphery distance in the melter" is the arithmetic mean distance over the height of the melting chamber between the burner axis and its closest portion of peripheral wall.

The melter may be adapted and/or configured to sinter and/or melt raw materials. It may be a "glass melter", that is to say a melter adapted and/or configured to melt glass-like materials including materials selected from glass, vitreous materials, stone and rock. A glass melter may be used to manufacture flat glass, hollow glass, glass fibers, continuous fibers for reinforcement purposes, mineral fibers for insulation purposes, mineral wool, stone wool or glass wool. The melter may be used to transform raw materials to manufacture frits, cement clinker, notably alumina cement clinker, or abrasives, notably abrasives produced by melting. The melter may be used to transform raw materials, notably by vitrification, for example: vitrification of medical wastes; vitrification of ash, notably from incinerators; vitrification of powders, for example dusts from cast iron or other metal foundries; vitrification of galvanic sludge, tannery sludge or mining industry waste; disposal of waste, notably by vitrification, for example, of polluted soil, soil polluted by heavy metals or tar, clay filters, sludge, activated carbon, radioactive waste, slags containing lead or zinc, refractories, notably refractories containing chromium. Particularly in the case of a glass melter, the raw materials may comprise: silicates, basalt, limestone, soda ash, zeolite catalyst, spent catalyst, spent pot liner, refractory materials, aluminum dross, aluminium melting scum, sand based fire extinguisher waste, sludge, galvanic sludge, clinker, waste materials, ash and combinations thereof.

The melt within the melter during operation may reach a temperature, notable a temperature at which it is removed from the melter, which is at least 1100° C., at least 1200° C. or at least 1250° C. and which may be no more than 1650° C., no more than 1600° C., no more than 1500° C. or no more than 1450° C.

In the case of a glass melt, the composition of the melt produced may comprise one or more of:

|  | Possible melt composition (% weight) | Preferred melt composition (% weight) |
| --- | --- | --- |
| $SiO_2$ | 35-70 | 40-65 |
| $Al_2O_3$ | 5-30 | 15-25 |
| CaO | 5-20 | 5-12 |
| MgO | 0-10 | 1-7 |
| $Na_2O$ | 0-20 | 5-18 |
| K2O | 0-15 | 0-10 |
| $Fe_2O_3$ (total iron) | 0-15 | 0.5-10 |
| B2O3 | 0-10 | 0-5 |
| $TiO_2$ | 0-5 | 0-2 |
| BaO |  |  |
| $P_2O_5$ | 0-3 | 0-2 |
| MnO | 0-3 | 0-2 |
| $Na_2O + K_2O$ (alkali metal oxide) | 5-30 | 5-20 |
| CaO + MgO (alkaline earth metal oxide) | 5-30 | 5-20 |
| SiO2 + Al2O3 | 50-85 | 60-80 |

The boron content of glass produced, expressed as B2O3, may be ≥1 w %, ≥2 w %, ≥3 w %, ≥5 w % and/or ≤20%, ≤18%, ≤15% or ≤10 w %.

The melters provide an efficient configuration for melting materials, notably vitrifiable materials, with low energy consumption and low capital costs and provide desirable melt characteristics including homogeneity in terms of temperature distribution and composition of the melt, leading to improved end product quality. They also allow melting of a wide variety of materials, notably vitrifiable material, including raw material (for glass formation these may be for example silicates, basalt, limestone, soda ash and other minor constituents) and waste material or ashes, and provide high flexibility in controlling process parameters.

In preferred configurations such melters improve the absorption of fresh raw material within the melt and the efficiency of the transmission of heat to fresh raw material, notably when added at the top of the melt whilst any bypass of raw material through the melter is largely avoided or at least further reduced. This provides a combination of efficient melting, notably of vitrifiable material, and hence to smaller melters for a given output flow whilst also improving melt homogeneity in terms of temperature profile and composition.

The height of a melt pool within the melter, especially when the melting chamber is substantially cylindrical, preferably with an internal diameter of the melting chamber of 1.5 m to 3 m, more preferably 1.75 to 2.5 m, may be:
≥about 0.75 m, ≥about 0.8 m, ≥about 0.85 m or ≥about 0.9 m; and/or
≤about 2.2 m, ≤about 2 m, ≤about 1.8 m, or ≤about 1.6 m.

Preferably, the majority of the mixing of the melt occurs in a central melting zone which may be substantially cylindrical and which may have a diameter which is: at least 25 cm, at least 30 cm, at least 40 cm, at least 50 cm, at least 60 cm or at least 70 cm and or no more than 200 cm, no more than 180 cm or no more than 160 cm.

The melter, or at least the melting chamber, may be liquid cooled. For example, it may comprise a double walled construction comprising an inner wall forming the periphery of the melting chamber and a spaced outer wall which together define a passage through which cooling fluid, notable water, may pass. Preferably, the melting chamber and/or the periphery of the melting chamber does not comprise refractory materials.

In preferred embodiments, the configuration of the melter enables generation of a toroidal melt flow pattern in which melt is ascending at proximity of the relevant central burner axis and converging inwardly towards the vertical melter axis at the melt surface and downwardly at proximity of said vertical melter axis, within an essentially cylindrical space having the central melting zone as a basis.

The submerged combustion melter may be equipped with 5 to 10 submerged combustion burners, more preferably 6 to 8 burners, depending on the melter dimensions, burner dimensions, operating pressure and other design parameters. Notably in the case of providing a melt for glass fiber, glass wool or stone wool production, the melting chamber may be cylindrical and may have an internal diameter of 1.5 to 3 m, preferably 1.75 to 2.5 meters.

The spacing between adjacent burners should be selected as a function of burner design, operating pressure and other parameters. Too small a distance between burners may lead to joining of the flames from individual burners, a phenomenon that should be avoided. Preferably, the adjacent burner spacing is about 1.5 to 2.5, more preferably 1.75 to 2.25, most preferably about twice the burner axis-periphery distance.

Advantageously, adjacent burners are arranged at a spacing between them of about 250-1200 mm, preferably about 500-900 mm, more preferably about 600-800, even more preferably about 650-750 mm.

According to a preferred embodiment, the burners are arranged at a suitable burner axis-periphery distance which favors the relevant flow described above and avoids flame attraction to the melter side walls. Advantageously, the burner axis-periphery distance is about 250-750 mm. Too small a distance between burners and side wall may damage and/or unnecessarily stress the side wall and/or be inefficient for heat transfer to the melt. A certain melt flow between a burner and the periphery of the melting chamber may not be detrimental and in some cases is desirable. Nevertheless, too a large distance between a burner and the periphery of the melting chamber tends to generate undesirable melt flows and may result in dead zones which mix less with the melt in the center of the melter; this can lead to reduced homogeneity of the melt. Preferably, the distance between each burner and the periphery of the melting chamber is arranged such that a layer of melt, for example a layer having a thickness of between about 2 mm and 20 mm, builds up as a substantially stationary boundary layer at the periphery. Such a boundary layer provides a protecting layer at the periphery of the melting chamber and facilitates operation without refractory linings, notably when the melter chamber periphery is liquid cooled.

Particularly in the case of a glass melter, each burner is preferably supplied with a combustible gas, notably comprising hydrocarbon(s), for example natural gas, and an oxygen containing gas, notably oxygen, technical grade oxygen (for example gas having an oxygen content of at least 95% by weight) or oxygen enriched air. Preferably, the combustible gas and the oxygen containing gas are supplied separately to the burner and combined at the burner and/or at nozzle(s) of the burner. Alternatively, other fuel types, for example liquid fuel or solid pulverized fuels, may be used, notably for waste vitrification.

In preferred embodiments, a toroidal melt flow pattern in the melt is generated in the melting chamber. The term "toroidal flow pattern" means that the velocity vectors of the moving fluid material form a circulation pattern in which they fill cross-sections of an essentially horizontal toroid which has as its central axis of revolution substantially the vertical central melting chamber axis and as its outer diameter approximately the circumference defined by the central burner axes, with material flowing from the outside toward the central melter axis at the melt surface. Such toroidal flows entrain fresh raw material centrally and deeply into the glass melter in the proximity of the central melter axis within a substantially cylindrical space having the central melting zone as basis, and improve the efficiency in transmitting heat to the fresh raw material in order to melt the raw materials quickly and easily and further enhance homogeneity of the melt. Preferably, the melt in the melter comprises a single such toroidal flow pattern The melt and/or the raw materials within the melter, at least at one portion of the melter and notably at the central melting zone, may reach a speed which is $\geq 0.1$ m/s, $\geq 0.2$ m/s, $\geq 0.3$ m/s or $\geq 0.5$ m/s and/or which is $\leq 2.5$ m/s, m/s, $\leq 2$ m/s, $\leq 1.8$ m/s or $\leq 1.5$ m/s.

The raw material to be melted may advantageously be introduced at or above the melt surface. The flow pattern of the melter allows for efficient absorption of raw material into the melt and thus efficient heat transfer to the fresh raw materials which are incorporated into the melt.

Each burner or of a group of burners, for example opposed burners, may be individually controllable. As a result, one or more burners close to a raw material discharge may be controlled at different, preferably higher gas speeds and/or pressures than adjacent burners, thus allowing for improved heat transfer to the fresh raw material that is being loaded into the melter. Higher gas speeds may be required only temporarily, that is, in the case of batch wise loading of fresh raw material, just during the time period required for absorption of the relevant load into the melt contained in the melter of the invention. It may also be desirable to control the burners that are located close to the melt outlet at a lower gas speed/pressure in order to control the outlet of the melt.

Each central burner axis may be slightly inclined from the vertical, for example by an angle which is $\geq 1°$, $\geq 2°$, $\geq 3°$ or $\geq 5$ and/or which is $\leq 30°$, preferably $\leq 15°$, more preferably $\leq 10°$, notably towards the center of the melter. Such an arrangement may improve the flow and direct melt flow away from the outlet opening and towards the center of the melter and/or favor a toroidal flow pattern. Preferably, for one or more burners there is an increase of at least 1% in the burner axis-periphery distance between the burner positioning plane and the top of the melter.

Advantageously, for one or more burners the central burner axis forms a swirl angle of at least 1° with respect to a plane which is perpendicular to the burner positioning plane, passes through the vertical central melting chamber axis and passes through the burner position. The swirl angle may be $\geq 1°$, $\geq 2°$, $\geq 3°$, $\geq 5°$ and/or $\leq 30°$, $\leq 20°$, $\leq 15°$ or $\leq 10°$. Preferably, the swirl angle of each burner is about the same. This arrangement of burners may be used to impart a tangential speed component to the combustion gases, thus imparting a swirling movement to the melt flow and further improving the mix of raw material and the homogeneity of the melt.

The melter preferably has a substantially cylindrical periphery, but may also show other shapes, for example an elliptical cross section or polygonal cross section showing more than 4 sides, preferably more than 5 sides, the essence being that in preferred embodiments the arrangement generates a toroidal melt flow as described above. It will be understood, that the more uniform the distances are between burners and side wall, the more uniform the toroidal melt flow will be.

The fresh raw material may be loaded by means of a feeder. Advantageously, the raw material is loaded through an opening into the melting chamber positioned above the melt surface. The raw material may be loaded batchwise. A batch of raw material may be comprised between 20 and 50 kg. In the case of a melter showing a production rate of approx. 70000 kg/day, the batch loading frequency may vary between 20 and 50 kg/min. It is preferred, however, to feed the raw material substantially continuously or in a manner close to being continuous. For reasons of process control, including temperature and flow control and homogeneity of the melt, it is preferred to feed small batches at high frequency rather than large batches at low frequency. Said opening is preferably closeable, for example by a piston or actuator; this may be used to minimize heat loss and/or escape of fumes through the feeder. Raw material may be prepared as appropriate for the relevant melt to be obtained and loaded into an intermediate chute. When the opening into the melting chamber is opened, the raw material may be introduced into the melter, notably in an opposite direction to escaping fumes and thus partially preheated as it falls onto the melt surface. Preferably, the feeding opening is arranged in a recess provided in the melter periphery above the melt surface, such that the raw material falls on the melt surface within a loading zone at a distance from the melter periphery.

Melt may be withdrawn continuously or batch wise from the melter, for example from a position at or towards the bottom of the melter. In cases where the raw material is loaded close to the melter wall, the melt outlet is preferably arranged at the melter periphery opposite the raw material inlet. In the case of discontinuous discharge of melt, the discharge hole is preferably controlled, for example using a ceramic piston.

One or more of the burners may be tube in tube burners which are also known as concentric tube burners. The central burner axis of one or more of the submerged combustion burners advantageously comprises the central axis of concentric tubes of a tube-in-tube burner. The submerged combustion burners inject high pressure jets of the combustion products into the melt sufficient to overcome the pressure of the melt and to create forced upward travel of the flame and combustion products. The speed of the combustion and/or combustible gases, notably at the exit from the burner nozzle(s), may be ≥60 m/s, ≥100 m/s or ≥120 m/s and/or ≤350 m/s, ≤330 m/s, ≤300 or ≤200 m/s. Preferably the speed of the combustion gases is in the range of about 60 to 300 m/s, preferably 100 to 200 m/s, more preferably 110 to 160 m/s.

According to a preferred embodiment, the melting chamber's peripheral walls consist of double steel walls separated by a circulating cooling liquid, preferably water. Particularly in the case of a cylindrical melting chamber, such assembly facilitates construction of the melting chamber and resistance to high mechanical forces and stresses. A cylindrical shape of the melter allows for optimization of the balance of stress on the outside wall. Preferably, as the walls are cooled, preferably water cooled, melt solidifies and forms a protective layer on the inside of the melter wall. In preferred embodiments the melting chamber does not require internal refractory lining and therefore avoids the need for associated costs and maintenance. In addition, in such cases the melt is not contaminated with undesirable components of refractory material eroded from the internal refractory lining. The internal face of the melter wall may advantageously be equipped with tabs or pastilles or other small elements projecting towards the inside of the melter. These may help constituting and fixing a layer of solidified melt on the internal melter wall which plays the role of a lining generating a thermal resistance and reducing the transfer of heat to the cooling liquid in the double walls of the melter.

The submerged combustion melter of the invention may be equipped with heat recovery equipment. For example, hot fumes exhausted from the melting chamber may be used to preheat raw material and/or a portion of their thermal energy may be recovered using a heat exchanger and/or their thermal energy may be used for other purposes in upstream or downstream equipment of a production line, e.g. a production line for insulating fiber products. Similarly, thermal energy from any cooling liquid circulating between hollow walls of the melting chamber may be recovered for heating or other purposes.

The disclosed method and melter are particularly suitable to melt all sorts of vitrifiable material in an efficient way, with reduced energy consumption and at reduced maintenance costs. A melter as per the invention is thus particularly attractive for use in a production line for mineral fiber products, for example glass fibers, glass wool and stone wool manufacturing. Particularly in the case of mineral wool fiber production, the output is preferably taken directly to fiberization without a refining step.

Figure 2:
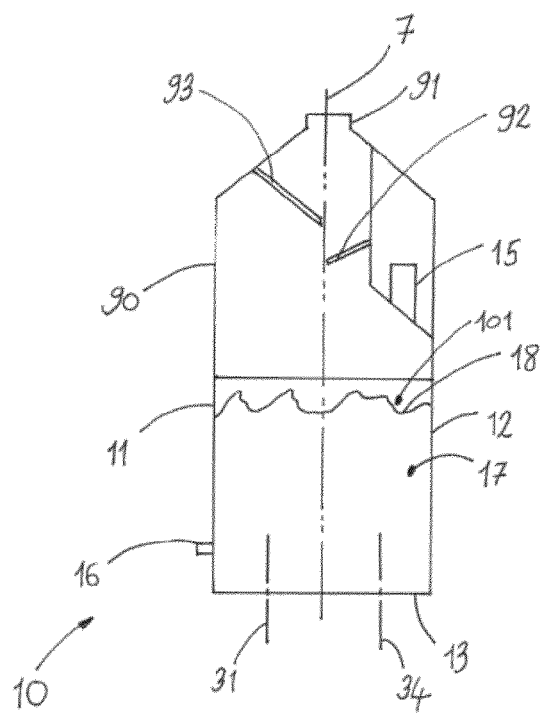
FIG. 2 shows a vertical section through the melter of FIG. 1.
Figure 3:
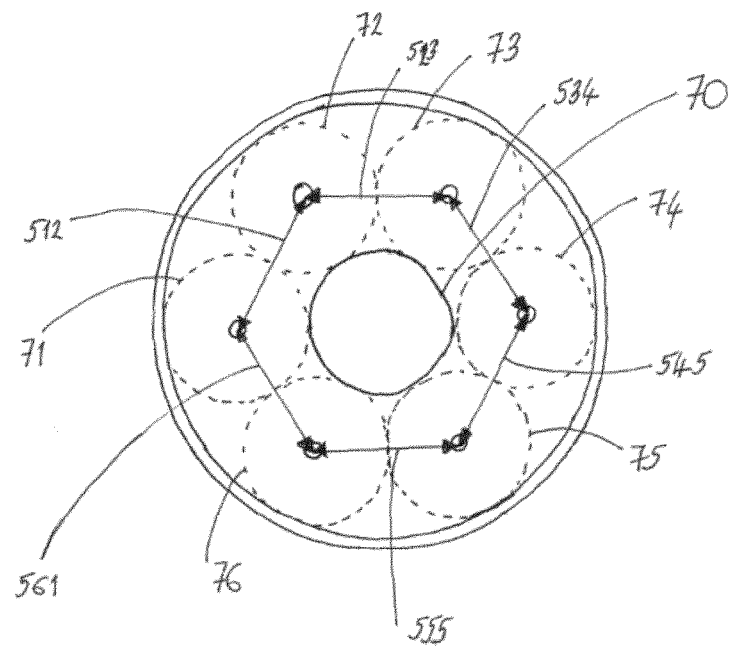
FIG. 3 shows a schematic representation of the burner layout.

An embodiment of the invention is described in more details below, by way of example only, with reference to the accompanying drawings of which:

FIG. 1 is a horizontal cross-sectional plan view of a melter;

FIG. 2 shows a vertical section through the melter of FIG. 1;

FIG. 3 is a schematic representation of the burner layout; and

Figure 4:
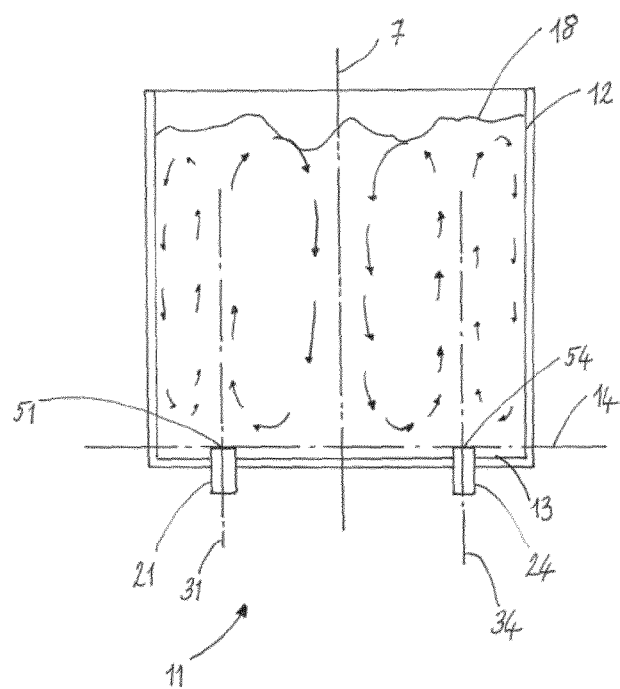
FIG. 4 shows a schematic representation of a preferred toroidal flow pattern.

FIG. 4 is a schematic representation of a preferred toroidal flow pattern.

The glass melter 10 illustrated in FIGS. 1, 2 and 3 comprises a melting chamber 11, that is to say a portion of the melter 10 adapted to retain and melt a heated melt 17, for example of a composition for manufacturing stone wool or glass wool fiber, and an upper chamber 90.

The illustrated melting chamber 11 is cylindrical and has a vertical central melting chamber axis 7, a periphery 12 defined by its internal circumference which has a diameter of about 2 m, a base 13 forming the lower ender of the cylinder and an open end at the upper end of the cylinder which communicates with the upper chamber 90.

The upper chamber 90 is provided with:
a chimney 91 for evacuation of the gasses from the melting chamber 11;
baffles 92, 93 that block access to any melt projections which may be thrown up from the surface of the melt 14; and
a raw material feeder 15 arranged at the level of the upper chamber 90 to load fresh raw material into the melter 10 at a batch introduction position 101 located above a surface 18 of the melt and close to the peripheral side wall 12 of the melter.

The feeder 15 comprises a screw or other horizontal feeder which transports a raw material mix to a hopper which may be opened and closed by a piston.

The melter has a double steel peripheral wall 19 having a cooling liquid, preferably water, circulating through its interior at a flow rate which is sufficient to maintain a desired temperature of the melter and of the cooling fluid and withdraw energy from the inside peripheral wall 12 such that a portion of the melt can solidify or partially solidify on the internal peripheral wall to form a boundary layer.

If desired the melter may be mounted on dampers to absorb vibrations.

Six submerged burners 21, 22, 23, 24, 25, 26 are arranged, equally spaced around a substantially circular burner line 27 which is concentric with the central vertical melting chamber axis 7 and has a diameter of approximately 1.4 m. Each submerged combustion burner has a respective central burner axis 31,32,33,34,35,36 and one or more outlet nozzles 41,42,43,44,45, 46 from which flames and/or combustion fluids are projected in to the melt 17. Each burner is positioned at a substantially identical adjacent burner spacing 512, 523, 534, 545, 556, 561 with respect to each of its two closest adjacent burner positions. The burner nozzles 41, 42, 43, 44, 45, 46 in the illustrated embodiment are arranged to project slightly above the base 13 of the melting chamber, each at the same vertical height as a burner positioning plane 14.

Each central burner axis 31,32,33,34,35,36 has a respective burner axis circle 71,72,73,74,75,76 which extends around the central burner axis and has a radius r1,r2,r3,r4, r5,r6 which is substantially equal to the distance between the central burner axis and the peripheral wall 12 of the melting chamber. These burner axis circles define a central zone 70 at the positioning plane 14 having a diameter of at least 250 mm.

The melt 17 may be withdrawn from the melting chamber through a controllable outlet opening 16 located in the melter chamber periphery side wall 12, close to the melter bottom 13, substantially opposite the raw material feeder 15.

The submerged burners 21,22,23,24,25,26 are tube in tube burners, sometimes referred to as concentric pipe burners, operated at gas flow or speed in the melt of 100 to 200 m/s, preferably 110 to 160 m/s. The burners generate combustion of fuel gas and air and/or oxygen within the melt. The combustion and combustion gases generate high mixing and high rates of heat transfer within the melt before they escape from the melt into the upper chamber 90 and are exhausted through the chimney 91. These hot gases may be used to preheat raw material and/or the fuel gas and/or oxidant (air and/or oxygen) used in the burners. The exhaust fumes are preferably cooled, for example by dilution with ambient air, and/or filtered prior to release to the environment.

It is preferable that the arrangement generates a toroidal melt flow as illustrated in FIG. 4 in which the melt follows an ascending direction close to the central burner axis of each submerged burner, flows inwardly towards the vertical central melting chamber axis 7 at the melt surface 18 and then flows downwards in an substantially cylindrical portion of the melting chamber which projects along the vertical central melting chamber axis 7 from the central melting zone 70. Such a toroidal flow generates high mixing in the melt, ensures good stirring of the melt and absorption of fresh raw material and allows for appropriate residence time of the material in the melter, thereby avoiding premature outflow if insufficiently melted or mixed raw materials.

The burners generate an ascending movement of melt in their proximity and a circulation within the melt. In one preferred embodiment, each burner axis is vertically oriented or inclined at an angle of no more than 15° from vertical, advantageously towards the center of the melter, in order to favor the generation of toroidal flow as taught above.

To further improve homogeneity of the melt, one or more burners may impart a tangential velocity component to its combustion gases, hence imparting a swirling movement to the melt flow, in addition to the toroidal flow pattern described above. For that purpose, the central burner axis of one or more burners may form a swirl angle of at least 1° with respect to a plane which is perpendicular to burner positioning plane 14 and which passes through the vertical central melting chamber axis 7 and the burner position.

The melter may be equipped with an auxiliary burner (not shown) notably for temporary use for example for preheating the melter when starting, in the case of malfunction of one of the submerged burners described above or in other cases where additional heat is temporarily required. The auxiliary burner is advantageously mounted on a rail so that it can be guided into an opening provided in the melter peripheral wall 12, the opening being closed when the auxiliary burner is not in use.

The internal melter wall 12 advantageously comprises a multitude of tabs or pastilles (not shown) projecting inside the melter chamber 11. It is believed these projections favor the formation and fixation of a solidified melt layer on the cooled wall 12, which constitutes an insulating layer. In the case of a glass melt for instance, glass solidifies on the cooled wall and forms an insulating boundary layer. Glass is thus melted in glass and the melt is not contaminated with erosion residues of any refractory material.

A melter according to the invention is particularly advantageous in a glass fiber, glass wool or stone wool production line because its efficiency provides for low energy consumption and its flexibility facilitates changes of raw material composition. Ease of maintenance and low capital costs of the melter are also of major interest in building such a production line. The same advantages also make the invention melter the melter of choice in waste and ash vitrification processes.

The invention claimed is:

1. A submerged combustion melter comprising a melting chamber having a periphery, a base, a vertical central melting chamber axis and a burner positioning plane,
the melter being equipped with:
a raw material feeder;
a melt outlet; and
at least five submerged combustion burners, each of the at least five submerged combustion burners having a respective central burner axis and one or more nozzle outlets;
the burner positioning plane being perpendicular to the central melter axis and arranged at a weighted average distance with respect to each of the nozzle outlets;
characterized in that
each of the at least five submerged combustion burners is arranged to project from a respective burner position defined by the intersection between the projection of its central burner axis and the positioning plane;
each burner position is arranged at a respective adjacent burner spacing with respect to each of its two closest adjacent burner positions and the difference between each adjacent burner spacing and the mean average of the adjacent burner spacings is less than or equal to 20% of the mean average of the adjacent burner spacings;
each central burner axis has a respective burner axis circle which projects around the central burner axis and has a radius which is equal to its weighted burner axis-periphery distance in the melter;
the difference between the radius of each burner-axis circle and the mean average radius of the burner-axis circles is less than or equal to 20% of the mean average radius of burner-axis circles;
the melter has a central zone at the positioning plane defined between the burner axis circles at the positioning plane, the central melting zone having a diameter of at least 250 mm; and
the melter is arranged such that an essentially toroidal melt flow pattern is generated in a melt of vitrifiable material, said toroidal melt flow pattern comprising major centrally inwardly convergent flows at the melt surface, the central axis of revolution of said toroidal melt flow pattern being essentially vertical.

2. The melter of claim 1, in which the melter is equipped with between 5 and 10 submerged combustion burners.

3. The melter of claim 1, in which each central burner axis is arranged at an angle of less than 15° from vertical.

4. The melter of claim 1, in which for one or more burners the central burner axis forms an angle of at least 1° with respect to a plane which is: perpendicular to burner positioning plane; passes through the vertical central melting chamber axis; and passes through the burner position.

5. The melter of claim 1, in which the central burner axis of one of more of the submerged combustion burners comprises the central axis of concentric tubes of a tube in tube burner.

6. The melter of claim 1, in which the melting chamber is substantially cylindrical.

7. The melter of claim 1, in which the melting chamber is substantially cylindrical and has a periphery having a diameter between 1.5 m and 3.5 m.

8. The melter of claim 1, in which the weighted burner axis-periphery distance in respect of each of the at least five submerged combustion burners is between 5 cm and 80 cm.

9. The melter of claim 1, in which the adjacent burner spacing with respect to each of the at least five submerged combustion burners is between 25 cm and 120 cm.

10. The melter of claim 1, in which the distance between each burner position in respect of each of the at least five submerged combustion burners and the central melter axis is between 50 cm and 150 cm.

11. A production line for a glass product selected from the group consisting of glass fibers, glass wool and stone wool comprising:
   the melter of claim 1; and
   a fiberiser arranged to transform melt from the melter in to fibers.

12. A method of providing a molten vitrifiable material comprising the steps of:
   introducing solid batch material into the melter of claim 1; and
   melting the solid batch material in the melter by submerged combustion to provide the molten vitrifiable material within the melter.

13. The method in accordance with of claim 12 wherein the melt moves downwardly in the center at proximity of the axis of revolution and is recirculated in an ascending movement back to the melt surface, thus defining an essentially toroidal flow pattern.

\* \* \* \* \*